Oct. 28, 1958 F. D. SNYDER 2,857,758
TENSILE TESTING APPARATUS
Filed June 14, 1954 6 Sheets-Sheet 1
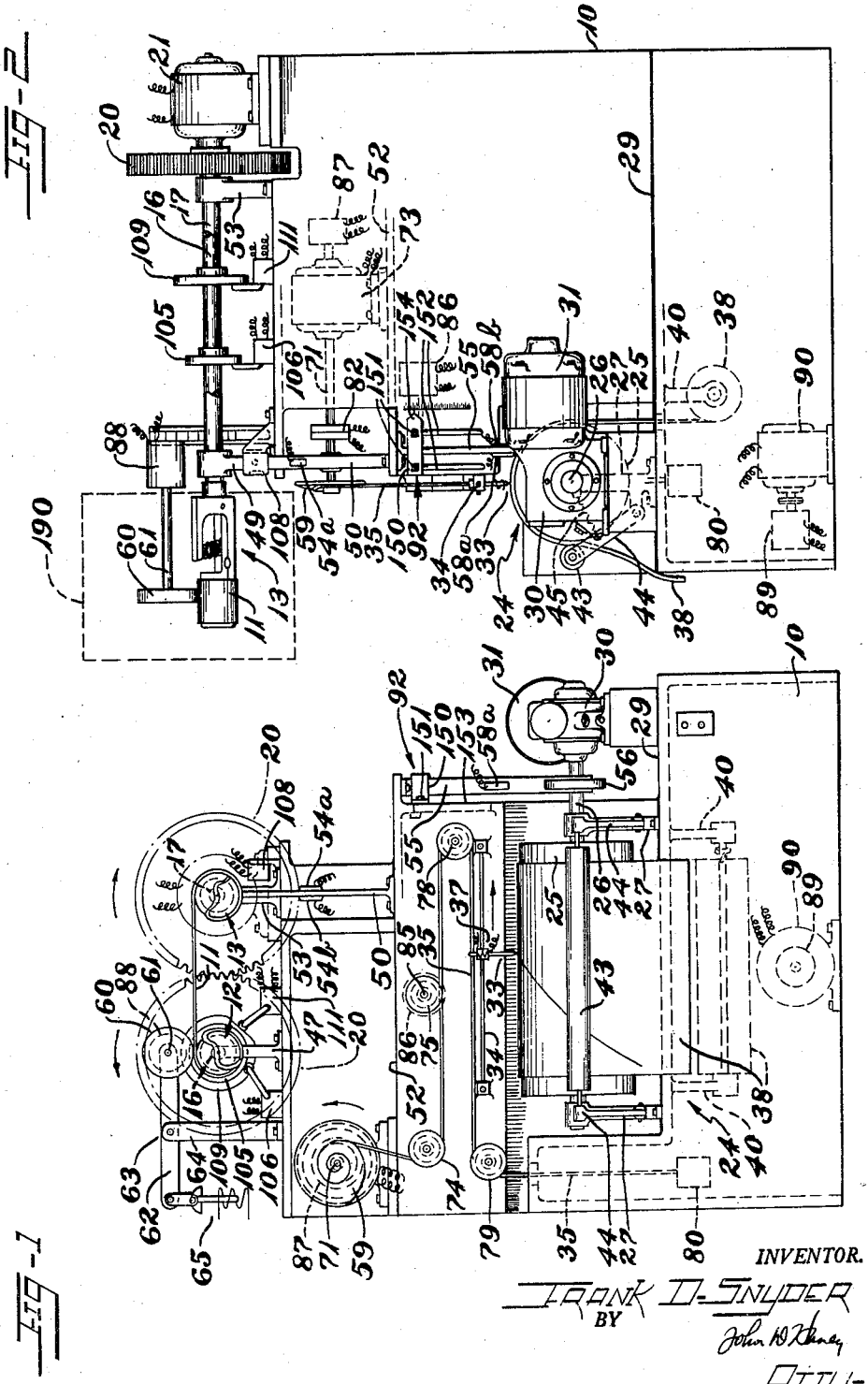
INVENTOR.
FRANK D. SNYDER
BY John D. Kheney
ATTY.

Oct. 28, 1958 F. D. SNYDER 2,857,758
TENSILE TESTING APPARATUS
Filed June 14, 1954 6 Sheets-Sheet 2
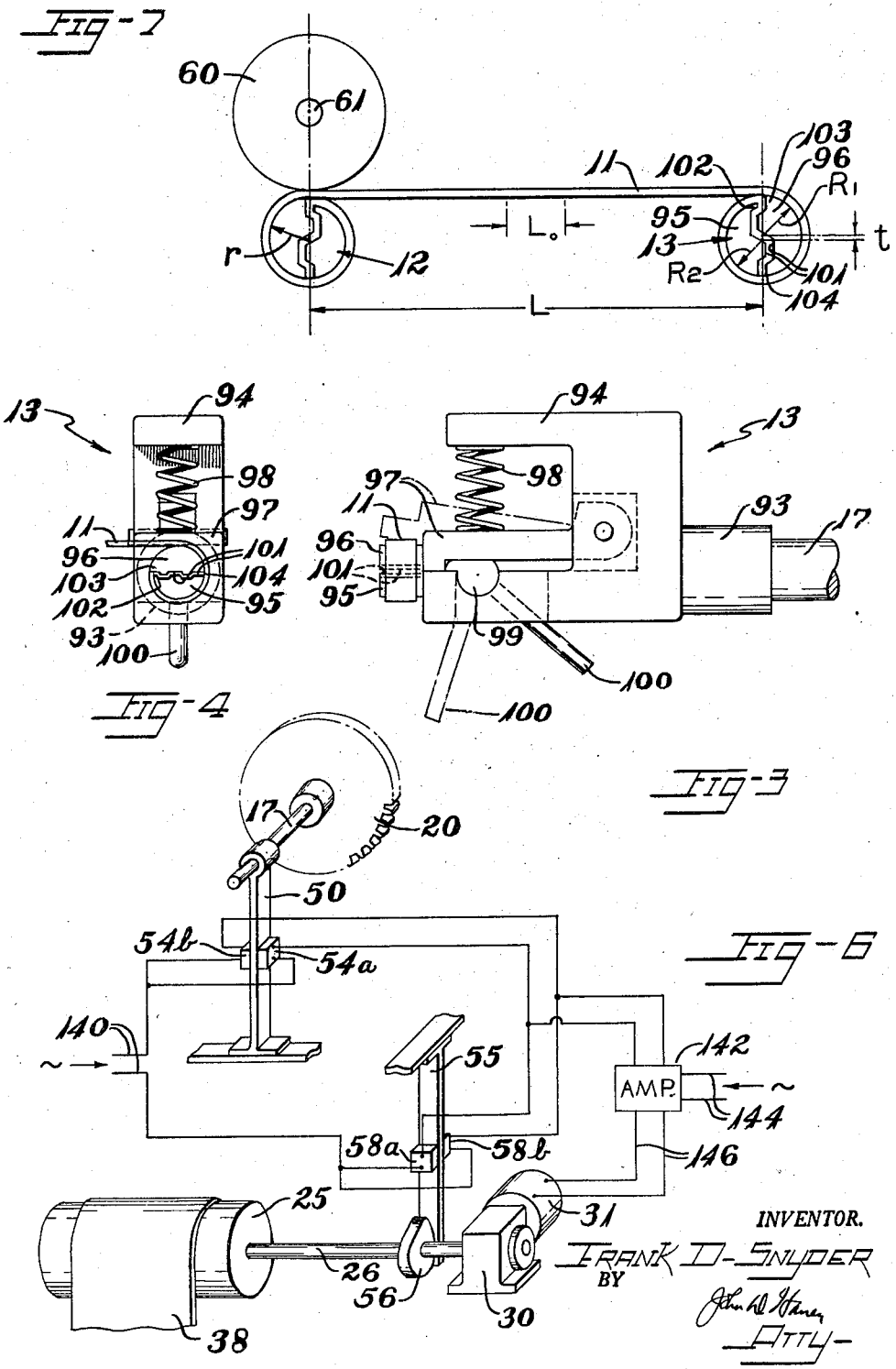

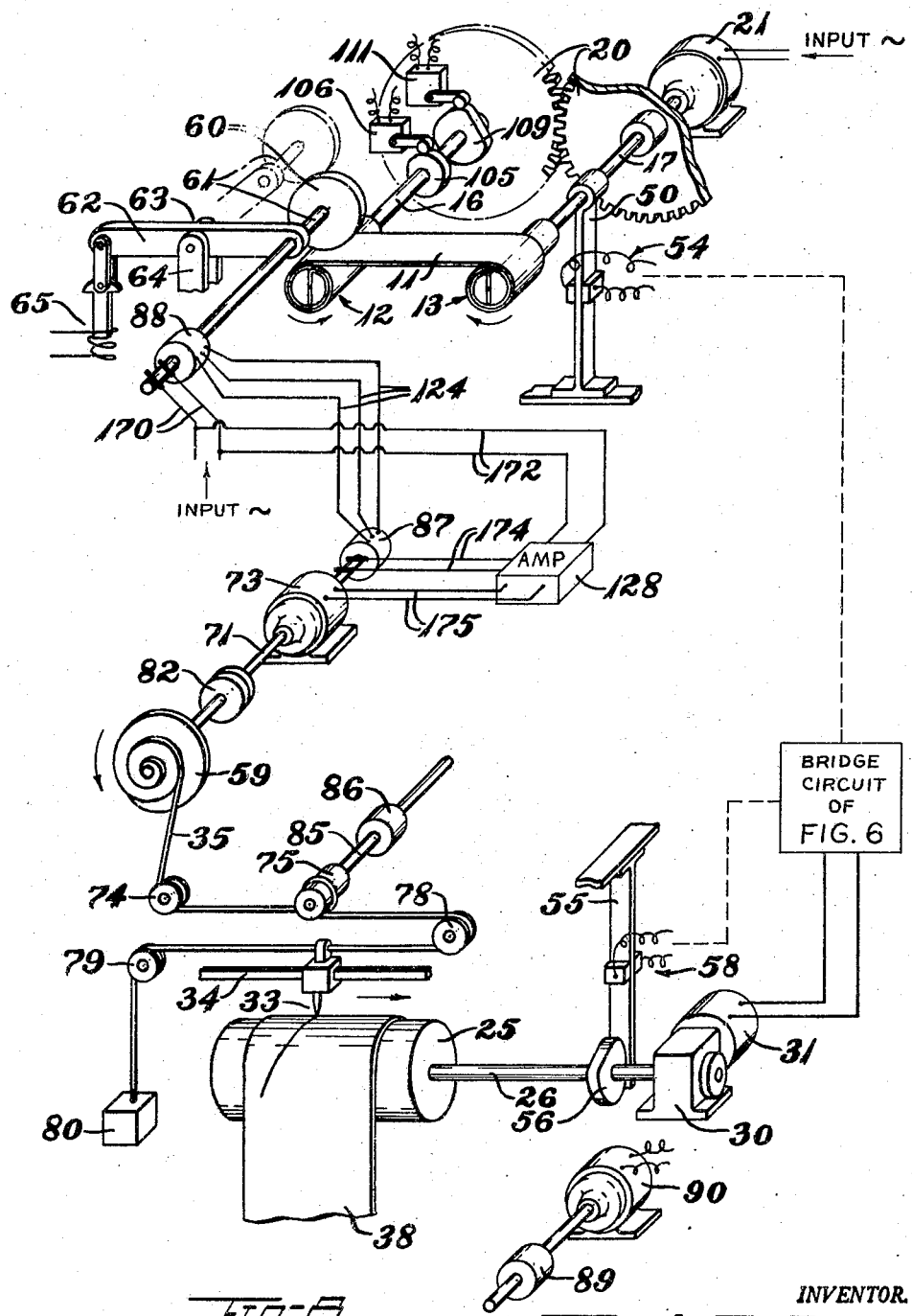

Oct. 28, 1958  F. D. SNYDER  2,857,758
TENSILE TESTING APPARATUS
Filed June 14, 1954  6 Sheets-Sheet 5

INVENTOR.
FRANK D. SNYDER
BY John D. Haney
ATTY

Oct. 28, 1958 F. D. SNYDER 2,857,758
TENSILE TESTING APPARATUS
Filed June 14, 1954 6 Sheets-Sheet 6
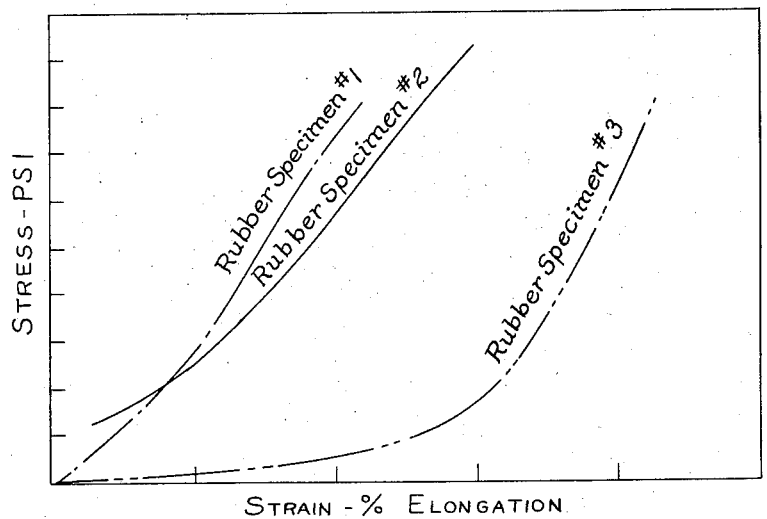
Fig-10
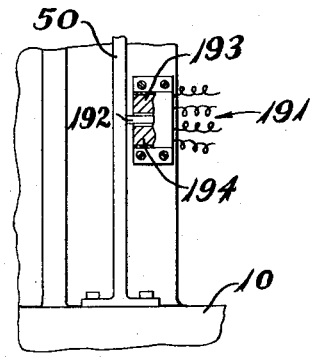
Fig-11
Fig-12
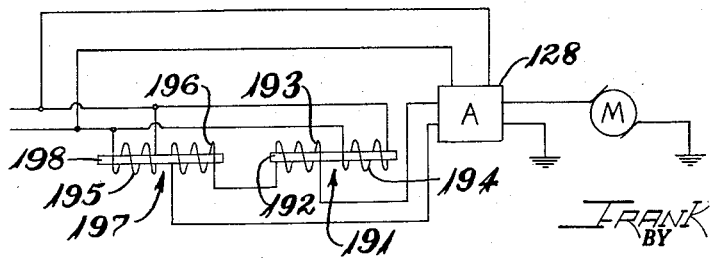
INVENTOR.
FRANK D. SNYDER
BY John W. Harney
ATTY.

United States Patent Office 2,857,758
Patented Oct. 28, 1958

2,857,758

TENSILE TESTING APPARATUS

Frank D. Snyder, Akron, Ohio, assignor to The B. F. Goodrich Company, New York, N. Y., a corporation of New York Application June 14, 1954, Serial No. 436,376

20 Claims. (Cl. 73—89)

This invention relates to testing flexible, extensible materials and is particularly useful in measuring and recording the tensile load-elongation characteristics of highly extensible materials such as rubber and rubber-like polymers.

This application is a continuation-in-part of my application Serial No. 167,982, filed June 14, 1950, now abandoned.

The principal modes of tensile testing rubber prior to this invention have been the bar-type tests which employ a straight "dumbbell-shaped" strip of rubber as a sample, and the ring-type tests which utilize a sample in the form of an endless rubber ring. In each of these tests the sample is mounted between a pair of opposed grips or heads which are then separated to progressively elongate the sample until it ruptures. A comprehensive discussion of the limitations of these modes of testing may be found in Memler, Science of Rubber, Reinhold Publishing Corp., 1934, pp. 523–541. The principal limitations are the difficulty of accurately reproducing a test because of the shape of the samples required, and because of the way in which the samples are engaged with the heads. Further, neither of these procedures has been well adapted to the use of fully automatic test-recording devices which will operate without dependence on the skill of the technician and without imposing extraneous loads on the sample. Another test procedure has been proposed in which a sample in the form of a thin rectangular strip of rubber is stretched by progressively wrapping the ends of the sample upon a pair of spaced rotatable grips which operate like windlasses or capstans. This procedure is singularly free from the limitations of the previously mentioned test procedures but with this procedure it has been particularly difficult to measure the load and elongation of the sample with accuracy. Consequently, the bar and ring testing procedures have been most widely used.

A general object of this invention is to provide testing equipment in which the sample is stretched by rotatable grips and which includes novel apparatus for precisely sensing and automatically recording the load-elongation characteristics of the sample.

In accordance with this invention, the load imposed on the sample is accurately determined by sensing the lateral deflection occurring in one of the grips as the sample is progressively stretched. The elongation of the sample is measured by sensing the length of the sample wrapped on the grips as it is progressively stretched. The apparatus for sensing the load and that for sensing the elongation cooperatively operate the recording mechanism which automatically traces a curve of the load-elongation characteristics. The load sensing and elongation sensing apparatus each operate on the "follow-up" principal to provide for accurate operation of the recording mechanism.

The testing equipment of this invention may be operated to stretch the rubber sample in accordance with several modes of testing. The mode of testing of principal importance is that of stretching a sample at a constant rate of percent elongation until it is ruptured. This mode of testing is particularly advantageous since it is known that there is a variation in the ultimate strength and load-elongation characteristics of many rubber compounds depending on the rate at which the sample is elongated. Suitable means is included in the elongation sensing apparatus of this equipment to regulate the rotational speed of the grips to accomplish this result. Additionally the equipment may be operated to stretch a sample at a progressively increasing rate of percent elongation, and the equipment may also be operated to stretch a sample by applying successive equal increments of load to it. In each of these modes of testing the load-elongation relation is automatically traced on a rectangular coordinate chart by the recording mechanism.

Tests are easily reproducible in this testing equipment since the sample used is a small thin rectangular-shaped strip of rubber which is easy to cut to shape. The preferred samples may be less than 3 inches long and about 0.25" wide. The use of small samples is a distinct advantage in research work where the available supply of a particular polymer to be tested is generally very limited. The apparatus may be constructed so that it is small and compact and utilizes only a space of about 2 inches to stretch the sample to elongations which might require as much as 30 inches or more in the conventional test apparatus. The ends of the samples are prevented from slipping relative to the grips during a test. The sample extends directly from one grip to the other and no portion of this equipment engages the portion of the sample intermediate the grips to introduce extraneous loads on this portion of the sample. The grips may be also conveniently enlosed in a heat chamber or the like to permit regulation of the temperature during the test.

The invention will be further described with reference to the drawings in which:

Fig. 1 is a front elevation of testing apparatus constructed in accordance with and embodying the principles of this invention;

Fig. 2 is a side elevation of the apparatus of Fig. 1;

Fig. 3 is a side elevation showing in detail the construction of a preferred grip;

Fig. 4 is an end elevation of the grip of Fig. 3;

Fig. 6 is another schematic diagram showing the circuits used with the circuits of Fig. 5 for sensing the load imposed on the sample;

Fig. 7 is a diagrammatic view illustrating the various quantities utilized in deriving an equation which describes the shape of one of the cams of the apparatus;

Fig. 8 is a schematic diagram showing the same structural elements as Fig. 5 but showing the circuits employed where the mode of testing desired is to stretch the sample so that the rate of percent elongation is progressively increased throughout the test;

Fig. 10 shows typical types of curves traced by the apparatus for different rubber specimens;

Fig. 11 is an elevational view of another preferred device which may be used as a part of the load-measuring mechanism; and Fig. 12 is a diagram of a circuit employing the load-measuring mechanism of Fig. 11.

Figure 5:
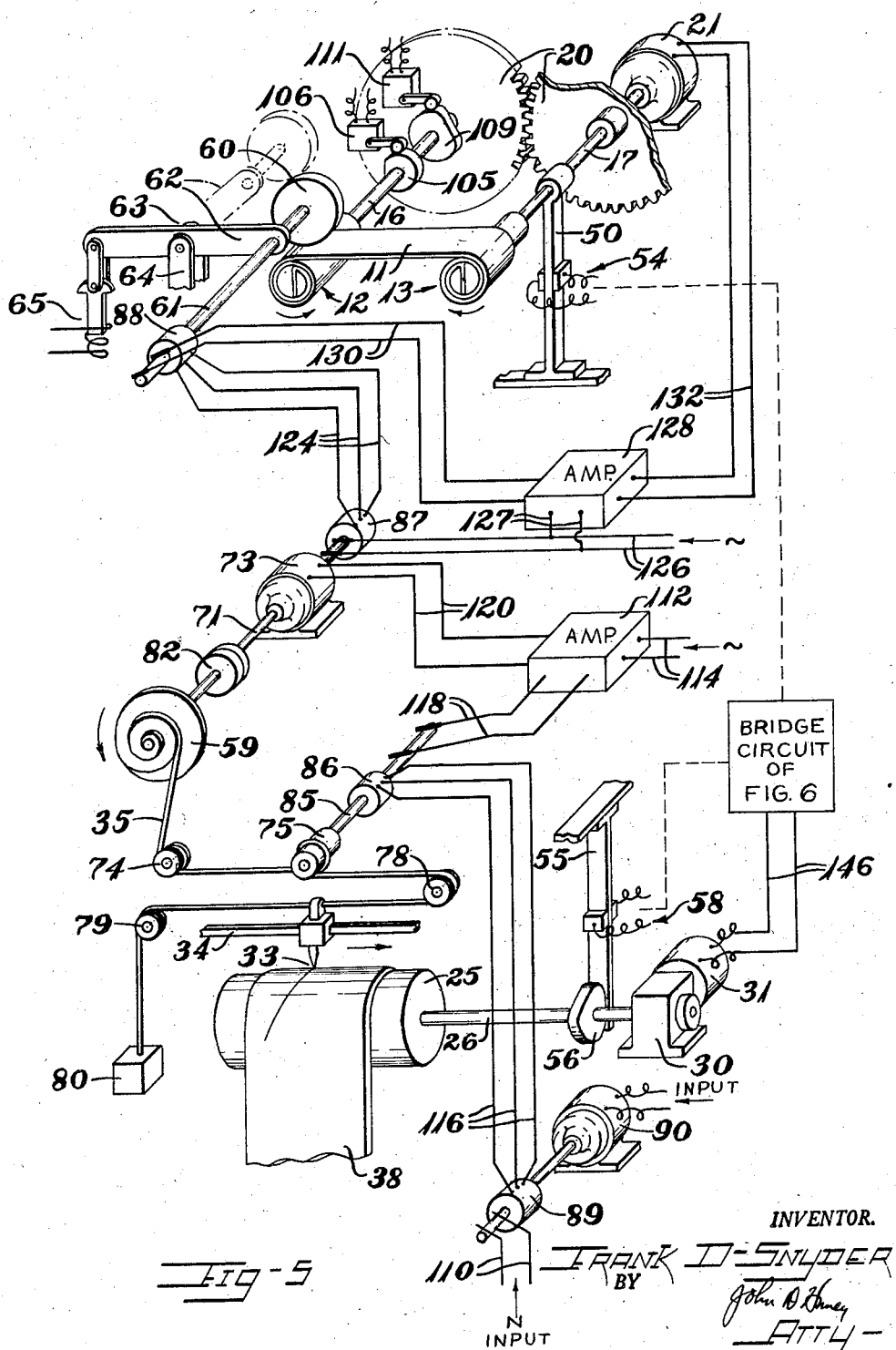
Fig. 5 is a schematic diagram showing various elements of the apparatus of Fig. 1 in perspective and showing circuits connecting these elements for operating the apparatus to stretch a sample at a constant rate of percent elongation.

Because certain elements of the testing equipment shown in Figs. 1 and 2 have different functions when the apparatus is operated according to the several different modes of stretching the sample noted in the foregoing, the following description of Figs. 1 and 2 is directed primarily to the arrangement of the parts of the mechanism and the specific functions of these elements will be more fully explained in connection with Figs. 5, 8 and 9 which show the circuits employed for each particular mode of stretching.

Referring to Figs. 1 and 2, the various elements of the apparatus are supported and housed by a frame 10. A test sample 11 is received by a pair of grips 12 and 13 which are located at the upper front portion of the frame in laterally spaced relation. Each end of the sample is held between the jaws of its respective grip and the remaining portion of the sample extends directly from one grip to the other and tangentially to the grips. The grips 12 and 13 are supported by a pair of shafts 16 and 17, respectively, which extend horizontally across the top of the frame 10 parallel each other to the rear of the apparatus where each supports one of a pair of meshing gears 20 of equal diameter. The rearward end of shaft 17 is coupled to a motor 21 which, through the gears 20, rotates the shafts 16 and 17 simultaneously in opposite directions to wind the ends of the sample on the grips.

As the sample is progressively stretched in this manner, the load-elongation relationship of the specimen is automatically traced by a recording mechanism 24 located near the lower front of the frame 10. This recording mechanism 24 includes a cylindrical drum 25 which is supported horizontally by a shaft 26 journaled at each end of the drum by bearing brackets 27 mounted on a shelf 29 in the lower portion of frame 10. The right end of shaft 26, as it is viewed in Fig. 1, extends from the drum 25 into a gear transmission 30 engaged with a motor 31 which is operable during a test to rotate the drum. The recording mechanism 24 further includes a tracing pen 33 which is disposed radially of the drum and is slidable lengthwise along the drum on a stationary horizontal rod 34 by a flexible cord 35 to which the pen is connected. The pen is provided with a small solenoid 37 to retract the pen from the drum at the completion of a test. A roll of chart paper 38 on which the pen traces the results of the test is supported by a pair of brackets 40 under the shelf 29 and the paper is fed in a continuous strip around the upper surface of the drum and under the pen to the front of the apparatus. The paper is pressed against the front of the drum by a tensioning roller 43 supported by a pair of arms 44 which are pivotally connected to the frame and engaged with a pair of springs 45 which are stretched between the pivoted arms 44 and the brackets 27. The paper 38 is drawn from its supply roll by the rotation of the drum during a test. In this illustrated embodiment of the invention, the rotation of the drum is proportional to the load imposed on the sample and the movement of the pen along the drum is proportional to the percent elongation, so that in the resulting chart the ordinates represent increments of load and the abscissae represent increments of percent elongation.

The load imposed on the sample is determined by sensing the lateral deflection of the grip shaft 17 as the sample is wound around the grips. To accomplish this the shaft 16 is journaled both at its forward end close to the grip 12 and at its rearward end adjacent the gear 20 by a pair of bearing brackets 47 (only the front bracket 47 is visible in the drawings, see Fig. 1) so that no appreciable displacement of grip 12 occurs as the sample is stretched. Shaft 17, however, is mounted so that grip 13 may be displaced laterally by journaling the forward end of shaft 17 in a self-aligning bearing 49 at the top of a thin vertical steel beam 50, the lower end of which is fastened to a shelf 52 in the frame 10, whereas the rearward end of shaft 17 is journaled close to the gear 20 by a rigid bearing bracket 53 secured to the top of the frame. The tension in the sample produced by the winding deflects the forward end of shaft 17 together with its grip 13 toward the grip 12, thereby bending the vertical beam 50. At about the midpoint intermediate the ends of beam 50, there is a pair of sensitive electric strain gauges 54a and 54b mounted on opposite sides of the beam which translate the deflection of the beam to a proportional electrical signal as hereinafter explained.

The mechanism for sensing the load also includes a second vertical beam 55 of the same size and shape as beam 50 but which is fastened to the bottom of shelf 52 and extends downwardly toward the drum shaft 26. The lower end of beam 55 is unsupported and contacts the peripheral surface of a cam 56 mounted on the shaft 26 between the drum 25 and the gear transmission 30. The cam 56 is shaped so that as the shaft 26 is rotated, cam 56 deflects the lower beam 55 an amount corresponding to the deflection of the upper beam 50. At the midpoint of the lower beam 55 there is a pair of electric strain gauges 58a and 58b which sense the amount of deflection by beam 55 caused by the cam 56. The resulting electrical signal produced by these latter gauges is utilized with the initial signal from the strain gauges 54a and 54b to control the rotation of the drum 25 in a manner which will be more fully explained hereinafter in connection with Fig. 6 and the different modes of testing.

In the mode of testing in which the sample is stretched at a constant rate of percent elongation, the rotation of the grips 12 and 13 and the movement of the pen 33 along the drum to record percent elongation are regulated by mechanism which includes a spiral-shaped cam 59 to which the pen cord 35 is secured, and a rider wheel 60 which is supported in a vertical plane above the grip 12 by a horizontal shaft 61. The shaft 61 is journaled in a bar 62 which is pivotally supported at a point 63 by a stanchion 64 mounted on the top of the frame and the opposite end of bar 62 is connected to a solenoid 65. Normally the rider 60 is supported by the bar 62 in a position away from the grip 12 and, when a test is begun, the solenoid 65 is energized to swing the bar 62 about the pivot 63 to move the rider into contact with the end of the sample secured in grip 12 and the rider is rotated by the frictional engagement between the rider and the sample. Although the rider wheel 60 is relatively light in weight, its weight is sufficient to maintain driving engagement with the sample and the rider is supported on precision ball bearings so that the frictional resistance to rolling is negligible. The peripheral edge of the rider 60 contacts the longitudinal center line of the sample at a point directly above the point where the sample is tangent to the grip so that the weight of the rider is actually supported by the grip and the rider does not impose any extraneous loads on the sample which could affect the tensile load in the portion of the sample between the grips.

The cam 59 is fixed to the front end of a horizontal shaft 71 which is suitably journaled above the shelf 52 of the frame and the cam 59 is rotatable by a motor 73 which is coupled to the opposite end of shaft 71. The pen cord 35 is fastened to the cam 59 at the vortex of the spiral surface and is wrapped around a portion of this surface. The cord is then trained around an idler pulley 74 and then extended horizontally to a sheave 75 around which the cord is looped in one or more turns. From the sheave 75 the cord is trained around a second idler pulley 78 and then is doubled back so that it extends parallel to the rod 34 to the pen 33 to which it is secured. From the pen, the cord extends to a third idler pulley 79 around which it is trained to extend downwardly and there is a weight 80 suspended from the lower end of the cord. At the start of a test, the pen 33 will be positioned toward the left end of the drum 25 as it is shown in Fig. 1; the cord 35 will be unwound from the cam 59;

and the weight 80 will be in its lowest position close to the bottom of the frame. As a test proceeds, the motor 73 rotates the cam 59 in a counter-clockwise direction (see arrow in Fig. 1) to wind the cord on the spiral surface of the cam thereby pulling the pen toward the right end of the drum 25 and raising the weight 80. To reset the pen to its initial position at the left end of the drum, a magnetic clutch 82 (Fig. 2) is interposed in the shaft 71 between the cam 59 and the motor 73. Upon completion of a test, the clutch 82 is operated to disengage the cam 59 from the motor 73 thereby allowing the weight 80 to sink toward the bottom of the frame and unwind the cord from the cam 59 so that the cord returns the pen to the left side of the drum. During this reset movement of the pen, appropriate electrical circuits energize the solenoid 37 to retract the pen 33 from the paper 38 on the drum.

The sheave 75 around which the cord is looped between the idler pulleys 74 and 78 is mounted on one end of a shaft 85 which is journaled below the shelf 52 in the frame. The other end of this shaft is coupled to the rotor of a Selsyn 86 which is one of a series of electro-mechanical elements for operating the apparatus to effect the different modes of testing. In addition to Selsyn 86 there is a Selsyn 87 coupled to the rotor of motor 73; a Selsyn 88 mounted on the shaft 61 which supports the rider wheel 60; and a Selsyn 89 coupled to and driven by a pilot motor 90 which is located at the bottom of the frame 10 and which is utilized for operating certain mechanisms of the apparatus in the modes of testing in which the sample is stretched at a constant rate of percent elongation.

The elements herein designated as "Selsyns" are also known as "Autosyns" or as "Synchros." Each of these elements has a rotor with a two-pole winding thereon and a stator with three-pole windings. The rotors of these Selsyns are very light in weight and may be rotated by only a very slight torque. For example, the frictional engagement of the cord 35 on the sheave 75 as the cord is moved is sufficient to spin the rotor of Selsyn 86.

The structural details of grip 13 are shown in Figs. 3 and 4 and grip 12 is identical. The grip 13 is connected to its supporting shaft 17 by a collar 93 engaged with a C-shaped member 94. A generally semi-cylindrical gripping jaw 95 is formed integrally with one leg of the member 94 in coaxial alignment with the shaft 17. The opposite semi-cylindrical gripping jaw 96 is mounted on a lever arm 97 which is pivotally connected to the member 94. The jaws are urged together in mating relation to engage the end of a sample interposed between them by coil spring 98. To separate the jaws to insert the end of a sample, a small cam 99 is rotatably secured to the member 94 and is rotated by a handle 100 against the lever arm 97 to swing the arm 97 against the spring 98. The mating surfaces 101 of the jaws 95 and 96 are formed with complementary corrugations to hold the ends of the sample more securely between the jaws. The spring 98 preferably is not strong enough to cause any appreciable crushing of the ends of the specimen but provides sufficient pressure to prevent slippage of the ends until the sample has been wrapped about the grip for several turns. As the sample is elongated appreciably, its pressure against the grips effectively prevents slippage of the ends from between the jaws.

Since the rider wheel 60 is rotated by frictional contact with the sample at the grip, it is desirable to avoid irregularities on the jaws of the grip which may interfere with the rotation of the wheel 60. Each end of the sample is wound upon itself on each grip and to avoid the formation of a bump in the roll at the end of each convolution due to the thickness of the sample, the surface of the jaws of the grips should theoretically spiral outwardly in uniformly increasing increments from the corner 102 of jaw 95 around which the sample end is first deflected, to the corner 103 of jaw 96 at the end of the first convolution. Such a spiral surface is difficult to machine but it may be closely approximated by forming the jaws in the manner best shown in Fig. 7. The movable jaw 96 is formed with a radius $R_1$ which is greater than the cross-sectional radius $R_2$ of the fixed jaw 95 by an amount substantially equal to half the thickness of the sample. Further the centers or axes of these radii are offset laterally from each other by the same amount (see "$t$," Fig. 7). Therefore as the end of the sample is wrapped across corner 102 of jaw 95 it immediately proceeds to be wound on the preceding convolution without an abrupt change in the radius of the roll formed on the grip.

The samples used in this apparatus are narrow rectangular strips of sufficient length so that the portion of the sample between the grips before a test is begun is relatively slack. For example in one apparatus which has been constructed embodying this invention the samples used are rectangular strip 0.25" wide x 2.75" long x 0.025" thick. The samples are easily cut to a uniform length and a uniform width. The apparatus is also designed to accommodate samples of different thicknesses and a mechanism 92 (Fig. 1) for adjusting the apparatus to accommodate such samples is provided and will be explained in connection with Figs. 5 and 6.

The apparatus is designed so that the mating surfaces 101 of the jaws 95 and 96 of each grip will be in a vertical plane before a sample is engaged with the grips. At the start of a test, the jaws of each grip will be urged open by the lever 100 and then the end of the sample inserted between them so that the end is aligned with the opposite side of the grip substantially as indicated by numeral 104 in Fig. 4. The grip motor 21 is then operated to rotate the grips to take up the slack in the sample until the sample extends tangentially from one grip to the other but is still in an unstretched condition. The period for which he motor 21 runs to accomplish this is the same for every sample and is measured by a cam 105 mounted on shaft 16 (see Figs. 1 and 2). The cam 105 rotates with the shaft 16 and at the instant all of the slack is removed, the cam 105 deflects a limit switch 106 which energizes the proper circuits to effect the mode of testing desired. These circuits also include the solenoid 65 which moves the bar 62 so that the rider wheel 60 is swung into contact with the sample at the instant the grips start stretching the sample.

The test is completed and the recording apparatus is stopped instantly whenever the sample ruptures. When rupture occurs, the beam 50 and shaft 17 which have been deflected by the load are released and these elements spring back to their normal position striking a limit switch 108 on the top of the frame close to the beam 50 which thereafter de-energizes the circuits which control the mode of testing.

Although the test is completed by the rupture of the specimen, circuits are provided to continue the rotation of the grips until the sample-engaging surfaces of the jaws are in a vertical plane so that the grips are in proper position to receive the next test sample. The grips are stopped in this position by a cam 109 on shaft 16 which engages a limit switch 111 to stop the motor 21 after the limit switch 108 has been operated by the beam 50.

*Stretching a sample at a constant rate of percent elongation*

The ultimate tensile strength and load-elongation characteristics of some rubber stocks is known to vary with the rate at which the rubber is stretched, and therefore it is desirable to stretch a sample at a constant rate of percent elongation. It may be noted that in the conventional bar-testing procedure which requires a "dumbell-shaped" sample, the rate of percent elongation of the sample is not constant even though the grips are separated at a constant linear speed. I have found by photographic studies of such tests of a typical natural rubber stock, the rate of percent elongation varied as much as 15% per second between 200% elongation and 600% elongation.

The term "percent elongation" as used herein means the ratio of the extended or stretched length of a portion of a sample to the unstretched length of this portion.

In this equipment, a sample is stretched at a constant rate of percent elongation by progressively decreasing the rotational speed of the grips 12 and 13 as the sample is elongated. The rotational speed of the grips is a logarithmic function of the rate of percent elongation of the sample, and in this equipment, the speed of the grips is regulated to stretch the sample precisely in accordance with this relation by the operation of the rider wheel 60, the cord 35, the cam 59 which has a spiral contour proportional to the logarithmic decrease in the rotational speed desired for the grips, and the other elements of the elongation-sensing apparatus.

The quantitative relation between the rate of percent elongation of the sample and the rotational speed of the grips may be noted by referring to Fig. 7 which shows the grips 12 and 13 with a sample 11 stretched between them. In this analysis it is assumed that once a portion of the sample is wrapped on the grips, no further stretching occurs in that portion. The radius of the grips is "$r$."

If a length of the sample, originally $L_0$, is stretched to a new length $L$, then the percent elongation $E$ is:

$$E = \frac{L}{L_0}$$

Suppose that the grips are again rotated through a small angle so that the length of the sample additionally wrapped on the grips is $2(2\pi r)dn$ where "$n$" is the angular velocity of the grips. Then $$E + dE = \frac{L + 4\pi r dn}{L_0}$$

or $$\frac{dE}{E} = \frac{4\pi r}{L} dn$$

Integrating and solving for the conditions that $L = L_0$ at $n = 0$ gives $$ln E = ln L_0 + \frac{4\pi r n}{L}$$

(The logs are to the base $e$.)

Considering $L_0 = 1$ when $n = 0$, then $$ln E = \frac{4\pi r n}{L}$$

or in more general form:

$$ln E = K n \quad (A)$$

where $K$ is a constant equal to $$\frac{4\pi r}{L}$$

for any particular machine. The surface contour of cam 59 is a graph of Equation A.

Fig. 5 illustrates schematically the manner in which the elements of the elongation-sensing apparatus are interconnected to stretch the sample at a constant rate of percent elongation. The pilot motor 90 (lower right corner) is coupled to the rotor of Selsyn 89. The rotor of Selsyn 89 is energized by leads 110 carrying single phase A. C. current, and A. C. current in phase with that of leads 110 is simultaneously fed to amplifier 112 by leads 114. The stator coils of Selsyn 89 are connected by the leads 116 to the corresponding stator coils of Selsyn 86 on shaft 85 which is rotated by the cord 35 around the sheave 75. The rotor of Selsyn 86 is connected by leads 118 to the amplifier 112. The amplifier 112 is in turn connected by leads 120 to the motor 73 which drives shaft to which the cam 59 is rigidly secured.

Additional elements of the elongation-sensing apparatus include a Selsyn 87 having its rotor coupled to motor 73 and having its stator interconnected by the leads 124 to the stator of Selsyn 88 on shaft 61 which supports the rider wheel 60. The rotor of Selsyn 87 is supplied with single phase A. C. current by leads 126 and this same current is fed through leads 127 to amplifier 128. The rotor of Selsyn 88 is connected by leads 130 to amplifier 128, and the power output terminals of amplifier 128 are connected by leads 132 to the grip motor 21.

The operation of these circuits is most easily seen by considering that these elements are operating intermittently. It will be understood however that in actual operation these elements operate continuously throughout a test.

Prior to the sample being stretched, the grips will be rotated by motor 21 to remove all slack in the sample, and appropriate circuits are energized to set the Selsyns at electrical zero or in balance with their mating Selsyn, engage the rider with the sample, and move the pen 33 onto the chart paper.

To stretch the sample, single phase A. C. current is supplied to leads 110 and 114 to energize, respectively, the rotor of Selsyn 89 and the amplifier 112. This current to the amplifier may be considered a base or reference current. The current to rotor of Selsyn 89 induces (by transformer action) a current in the stator leads 116 to Selsyn 86 where it in turn induces a current in the rotor coils of Selsyn 86 which is sent through the leads 118 to amplifier 112. This latter current is in phase with and of the same amplitude as the initial reference current to amplifier 112 and the amplifier is adapted to reverse the phase of one of these currents so that they cancel each other and there is initially no output signal through the leads 120 to motor 73. The amplifier preferably includes a thyratron tube adapted to perform this function.

Simultaneously with the energization of Selsyn 89 and amplifier 112, the pilot motor 90 is started and (while this normally rotates steadily) assume here it rotates to displace the rotor of Selsyn 89 through a small angle $A_1$ (not shown) to drive Selsyn 89 out of balance with Selsyn 86. The rotor of Selsyn 86 is restrained from turning through the same angle because it is engaged with the cord 35. Consequently, an electrical signal proportional to $A_1$ is sent through the rotor of Selsyn 86 and through the leads 118 to the amplifier 112. This latter signal plus the original current in leads 120 is now greater than the input reference current to amplifier 112 so that this signal (suitably amplified) is sent through the leads 120 to the motor 73. The motor 73 then rotates the shaft 71 thereby unwinding the cord from cam 59 and the cord in turn drives sheave 75 to turn the rotor of Selsyn 86 through $A_1$ to restore Selsyn 86 to an electrically-balanced position with Selsyn 89. Since the contour of cam 59 is a spiral, the position of the cord 35 on the cam 59 changes with each increment of rotation of the cam. Therefore it is apparent that the motor 73 must rotate shaft 71 through some angle $B_1$ different from $A_1$ in order for the cord 35 to bring Selsyn 86 into balance with Selsyn 89 in an interval of time equal to that required to displace the rotor of Selsyn 89 through $A_1$.

As soon as Selsyn 86 is restored to balance with Selsyn 89, the output signal from the amplifier 112 will be shut off. However, at this same instant the pilot motor 90 will then displace the rotor of Selsyn 89 through another angle $A_1$. Then the foregoing cycle of events will be repeated. At the start of this new cycle, the cord 35 will depend from a different portion of the surface of cam 59 than it did at the first cycle so that motor 73 must drive shaft 71 through a still different angle $B_2$ to return Selsyn 86 to balance. Therefore, with the pilot motor 90 operating steadily at a constant angular velocity, the motor 73 will rotate shaft 71 at a progressively decreasing speed in accordance with the shape of cam 59 as defined by Equation A, and the cord 35 will move the pen 33 at a uniform linear speed.

The rotation of shaft 71 and the uniform motion of pen 33 is accurately regulated by this system because the power supply to motor 73 is immediately shut off by Selsyn 86 as soon as Selsyn 86 is brought into balance with Selsyn 89. The Selsyn 86 therefore operates to "follow-up" the movement of motor 73, that is to prevent it from running more than the amount desired. In continuous operation, the motor 73 keeps trying to return Selsyn 86 to a balanced position with Selsyn 89 but is never able to accomplish this because pilot motor 90 continuously introduces a new angular variation into the circuit.

In deriving Equation A it was assumed that the portions of the sample on the grips did not stretch during further rotation of the grips. If this were correct, then the grips 12 and 13 could be driven directly from motor 73. Actually it is found that portions of the sample on the grips are stretched somewhat during suceeding rotation of the grips, and therefore the rotational speed of the grips must be modified or corrected in order to maintain the rate of percent elongation of the sample a constant value. Additionally, the grip speed must be corrected slightly for the fact that the radius of the roll formed on each grip increases as a test proceeds, and also that portions of the sample which have been wound on the grip may tend to slip backward from the grip slightly. It is the function of the rider wheel 60 in combination with the Selsyns 87, 88 and amplifier 128 to translate the motion of shaft 71 to the grips, and to correct the rotation of the grips for these effects.

Simultaneously with the start of pilot motor 90, a single phase A. C. current is introduced through leads 126 into the rotor of Selsyn 87 and into amplifier 128. The rotor current induces a current in the stator of Selsyn 87 which in turn is induced in the rotor coils of Selsyn 88 and delivered through the leads 130 to the amplifier 128 where it will be in phase with and of the same amplitude as the reference current through leads 126 to the amplifier 128. The amplifier preferably includes a thyratron tube adapted to reverse the phase of one of these signals so that they cancel each other so that there is no resulting output to grip motor 21 through leads 132.

When the pilot motor 90 turns the initial angle $A_1$, then as previously explained, the previous circuits and the cam 59 cause shaft 71 to rotate some different angle $B_1$ in same time interval. Thus, the rotor of Selsyn 87 is also displaced $B_1$ by shaft 71 to unbalance Selsyn 87 with Selsyn 88 and thereby causing current proportional to $B_1$ to flow through leads 124 to Selsyn 88 through which it passes to the amplifier 128. This new signal, being greater than the initial reference signal to amplifier 128 is appropriately amplified and delivered to the grip motor 21 to rotate it through leads 132. Preferably, the grip motor 21 operates on D. C. current and suitable means is included in the amplifier to rectify the output signal to motor 21.

The grips are thereby rotated an angle $B_1$ by the motor 21 and, simultaneously, the rider wheel 60 in contact with the sample on grip 12 is rotated through the same angular displacement as the grips. The rider wheel then rotates shaft 61 to drive the rotor of Selsyn 88 through an angle of $B_1$ to restore Selsyn 88 into balance with Selsyn 87 to shut off the output signal in the leads 132 of the amplifier 128.

As in the previous circuits, the rider wheel never succeeds in its effort to shut off amplifier 128 because as fast as it brings Selsyn 88 into balance with Selsyn 89 for the initial angle $B_1$, then shaft 71 is rotated through a second angle $B_2$, causing a repetition of the foregoing events. In this manner the motion of shaft 71 is translated to the grips and the Selsyn 88 acts to "follow-up" the grip motor 21 and shut it off as soon as the speed of the grips matches the speed of shaft 71.

If through slippage and the other factors noted, the sample is not actually stretched at a constant rate of percent elongation for a particular instant, then the rider wheel 60 does not rotate Selsyn 88 through a sufficient angle to balance it with Selsyn 89. Accordingly, the speed of the motor 21 will be immediately changed to correct this condition. The rider 60 therefore can vary the speed of the grip motor 21 appropriately to maintain the constant rate of percent elongation in the sample.

It may be noted that the lower circuits involving Selsyns 86, 89 and the amplifier 112 form an electrical differential comparable in operation to a mechanical differential gearing. Similarly, the upper circuits involving Selsyns 87, 88 and amplifier 128 form an electrical differential comparable to a mechanical differential gearing.

Summarizing, it may be seen from the foregoing that the pen 33 is moved linearly at a uniform speed along drum 25 and the rotational speed of the grips 12 and 13 are progressively decreased in accordance with the relation defined by the shape of the cam 59.

The mechanism and circuits for sensing the load imposed on the sample and controlling the rotation of drum 25 in this mode of stretching are shown at the right side of Fig. 5 and in Fig. 6. These operate independently of but in synchronism with the mechanisms which drive the grips. The foregoing description of the apparatus described the location of the beams 50 and 55, and their respective wire strain gauges 54 and 58. These mechanisms and circuits also function on the "follow-up" principle like the electro-mechanical apparatus which control the rotation of the grips. As shown in Fig. 6, an input single phase current is supplied through leads 140 to one end of each of the strain gauges 54a and 54b of beam 50, and to one end of each of the strain gauges 58a and 58b of beam 55. The opposite end of gauge 54a is connected to the opposite end of gauge 58a and to amplifier 142, and similarly gauge 54b is connected to gauge 58b and to amplifier 142. Also, a reference current in phase with that supplied through leads 140 is supplied to the amplifier by leads 144. As long as the resistance in each of these strain gauges is identical, a balanced bridge circuit is established so that the current into the amplifier from the gauges is equal to the reference current from leads 144, and there is no differential output signal through leads 146 to the drum motor 31.

When the grip 13 is displaced toward grip 12 to deflect shaft 17 and beam 50, the resistance of gauges 54a and 54b is changed and a proportional change occurs in the current flowing to the amplifier 142 which unbalances the bridge circuit formed by the strain gauges. Consequently, a proportional output signal (suitably amplified) is delivered by amplifier 142 through leads 146 to drum motor 31 which proceeds to rotate shaft 26 and the recording drum 25. The shaft 26 also rotates the cam 56 in contact with the lower free end of beam 55 as shaft 26 turns thus deflecting beam 55 in a direction opposite to beam 50. This deflection in turn changes the resistance of strain gauges 58a and 58b thereby introducing into the circuit to the amplifier a proportional signal counter to that introduced by the distortion of gauges 54a and 54b and which tends to return the circuit to a balanced condition and shut off the power output of amplifier 142. Since the beam 50 is progressively deflected by the sample, the cam 56 is never able to accomplish this function. This arrangement provides for very accurate regulation of the drum motor 31 in response to loads on the sample.

When the sample ruptures the shaft 17 and beam 50 spring back to their initial positions and in this movement strike switch 108 (under grip 13 in Figs. 1 and 2) which energizes appropriate circuits to actuate the pen solenoid 37 to raise the pen from the paper, and also energizes circuits to actuate solenoid 65 to lift rider wheel 60 from the sample. The drum motor 31 will continue to run however (by means of appropriate circuits not shown) until the cam 56 has made one complete revolution and returned to its initial starting position. The drum motor 31 drives shaft 26 through a gear transmission 30 at such a speed that the cam 56 will make less than one revolution throughout the test. The contour of cam 56 is shaped to provide uniformly-increasing deflection in beam 55.

For any particular stock, the deflection of beam 50 for a certain angular displacement of the grips will be proportional to the cross-sectional area of the sample. Accordingly, the contour of cam 56 and the sizes of the beams 50 and 55 are designed primarily for a sample of a certain cross-sectional area. Since the samples are rectangular, it is easy to cut the samples to the desired lengths and widths, but if the stock to be tested is materially thicker for example than the sample thickness for which the cam 56 and beams are designed, the cam 56 may execute a complete revolution before the sample ruptures so that the complete record of the load-elongation characteristics is not made by the pen. To avoid the necessity of changing the size of cam 56 for a thicker sample, this apparatus uses a mechanism 92 (see Figs. 1 and 2) which operates to effectively vary the length of beam 55 to compensate for samples of different thickness. This is accomplished by a generally U-shaped bracket 150 (Figs. 1 and 2) which surrounds the upper end of beam 55 and is secured by bolts 151 which extend through vertical slots 152 in a mounting plate 153. The bracket 150 is thereby vertically adjustable along the length of the beam and serves as a fulcrum about which the beam 55 may be deflected by cam 56. The bracket includes a pointer 154 registering with a suitable scale so that it may be easily adjusted for samples of different thickness. Where a thicker sample is used, the bracket will be adjusted to shorten the distance between it and the point of contact of the cam 56 with beam 55. Consequently, a particular displacement of the cam 56 causes a greater curvature in beam 55 than when the beam is longer and therefore a proportionately greater signal is generated by the strain gauges 58 to match the greater deflection in beam 50 resulting from the use of the thicker sample.

*Stretching the sample by uniform grip rotation*

The sample may be stretched by rotating the grips at a constant angular velocity (thereby progressively increasing the rate of percent elongation of the sample as the test proceeds) by interconnecting the control mechanisms in the manner shown in Fig. 8. For this mode of stretching, it may be noted that Selsyns 86 and 89, amplifier 112 and the pilot motor 90 are not used and are effectively disconnected. As shown in Fig. 8, one rotor of Selsyn 88 is energized by current through leads 170 which are additionally connected by leads 172 to the amplifier 128. The stators of Selyns 88 and 87 are interconnected by the leads 124 as previously but the rotor of Selsyn 87 is connected to the amplifier 128 by the leads 174. The output terminals of the amplifier are connected by the leads 175 to the cam motor 73.

The grip motor 21 is connected directly to a suitable power supply to operate it at a constant speed.

The circuits for sensing the load and controlling the rotation of the drum 25 are identical to and function in the same manner as the circuits shown in Fig. 6 previously described.

For this mode of testing, the sample is inserted into the grips and then the grips are rotated to remove the slack, etc. as in the previous mode of stretching.

To stretch the sample, the grip motor is then driven at a constant speed and, simultaneously, a single phase A. C. current is introduced through the leads 170 to the rotor Selsyn 88 and to the amplifier 128 through the leads 172. The current delivered to the rotor of Selsyn 88 is transformed to the stator of the Selsyn and conducted to the stator of Selsyn 87 by leads 124. Here it is again transformed to the rotor coils of Selsyn 87 and from there it is conducted through leads 174 to the amplifier. At the instant before any actual stretching occurs in the sample, the current into the amplifier in the leads 174 is of the same amplitude and phase as the reference current and the amplifier operates to reverse the phase of this current and cancel it so that there is no output from the amplifier to the motor 73.

When the grip motor 21 rotates the grips through a certain angle $C_1$ the rider wheel 60 is displaced through the same angle to move the rotor of Selsyn 88 out of balance with the rotor of Selsyn 87. Consequently, an electrical current proportional to angle $C_1$ is transmitted to the stator of Selsyn 87 but the rotor of Selsyn 87 is restrained from rotating because it is coupled to the motor 73. Therefore this proportional signal is transformed to the rotor of Selsyn 87 and is delivered to the amplifier 128. In the amplifier this proportional signal is suitably boosted and then delivered through the leads 175 to the motor 73 to rotate the motor 73.

The rotation of motor 73 turns shaft 71 and also turns the rotor of Selsyn 87 through the same angle $C_1$ in order to restore the electrical balance between Selsyn 87 and Selsyn 88 and thereby shut off the output current from the amplifier. However, as soon as motor 73 accomplishes this, the grips are rotated by motor 21 through another angle $C_1$ and the foregoing cycle of events is repeated. Therefore shaft 71 is caused to rotate at the same angular velocity as the rider wheel 60 and the grips. Shaft 71 rotates cam 59 to wind the cord 35 on the cam surface, thereby moving the pen 33 at a progressively-increasing linear speed along the chart paper on the drum so that the pen traces a curve in rectangular coordinates as in the former mode of stretching.

If the ends of the sample stretch somewhat, the rider wheel 60 is rotated by the sample through a different angle than the angle through which the grip is rotated at that instant and accordingly the shaft 71 will be displaced through the same angle as that of the rider. The pen 33 therefore traces the exact motion of the rider wheel which corresponds to the movement of the sample under the rider wheel at grip 12.

*Stretching the sample by equal increments of load*

Figure 9:
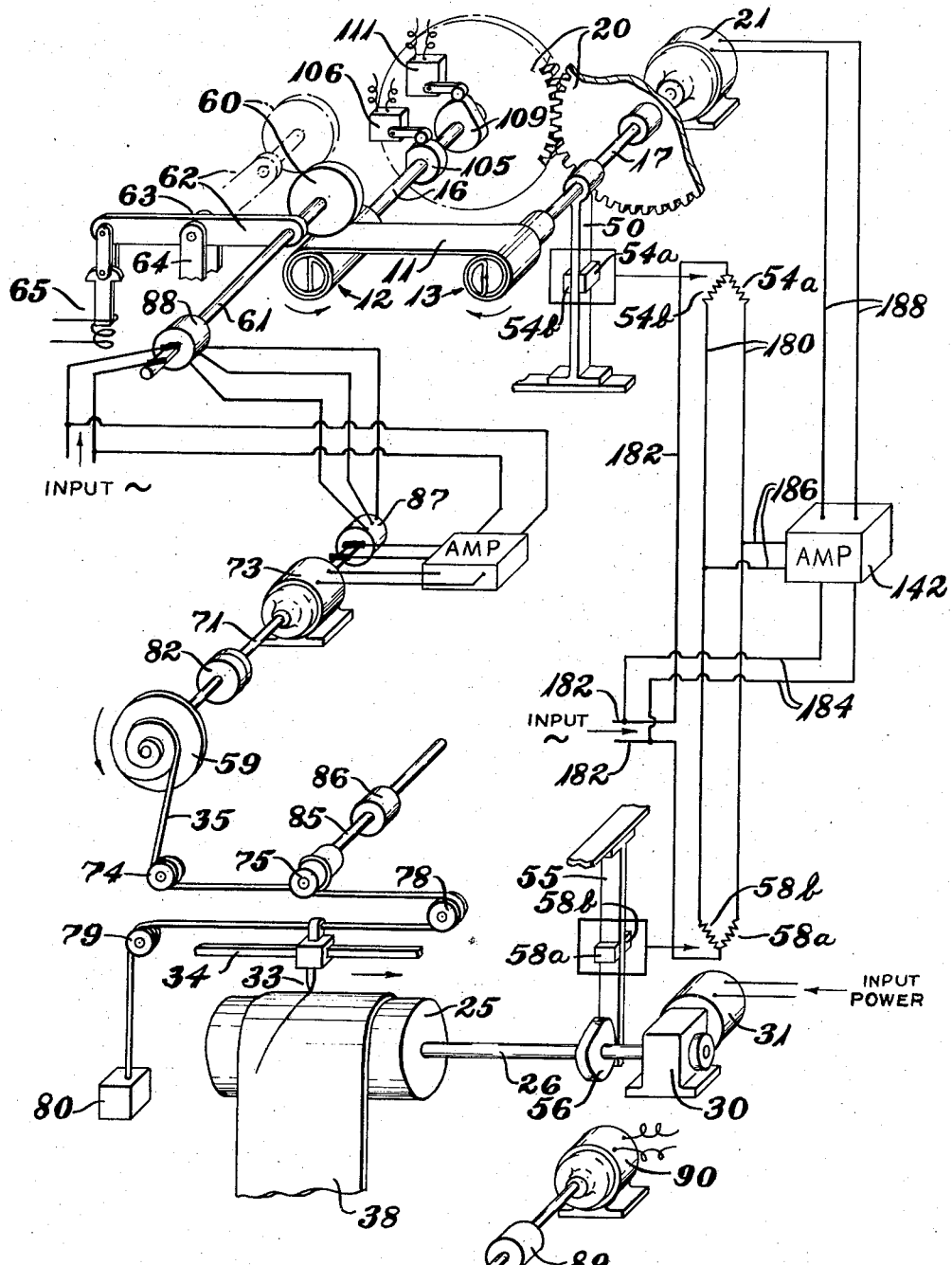
Fig. 9 is a schematic diagram similar to Figs. 5 and 8 but showing the circuits employed when the mode of testing is to elongate the sample by applying uniform increments of load.

Fig. 9 shows the manner in which the elements of this equipment may be interconnected to stretch a sample by adding to it equal increments of load. In this mode of stretching the mechanisms for sensing the elongation of the specimen and for controlling the movement of the pen 33 are identical with those shown in Fig. 8 and described in the preceding discussion. The grip motor 21 however is operated by the circuits shown at the right side of Fig. 9 which include the strain gauges 54 and 58 and the amplifier 142.

As shown in Fig. 9 the strain gauge 54a is connected in series with gauge 54b, and similarly the gauge 58a is connected in series with 58b, and each of the gauges 54a and 54b is connected by the leads 180 to the corresponding gauges 58a and b. The current is introduced into the gauges through the leads 182 and the same current is introduced into the amplifier to the leads 184. The junction of gauges 54b and 58b, and the junction of 54a with 58a are connected to the amplifier 142 by the leads 186. The output terminals of the amplifier are connected through the leads 188 to the grip motor 21 to drive the grip motor. The drum motor 31 is connected directly to a suitable power supply to rotate it at a constant speed.

As in the former circuits, the apparatus will first operate to take up the slack in the sample, and bring the rider wheel 60 and the pen 33 into operating position. Then to stretch the sample, the drum motor 31 is rotated at constant speed and, simultaneously, current is introduced into the leads 182 to the strain gauges and through the leads 184 into the amplifier 142. The input current to the amplifier through leads 186 is cancelled by the current supplied through leads 184 and at the instant before the sample is stretched there is no output current through the leads 188 to the grip motor 21. After the first instant of operation of drum motor 31, the cam 56 will be rotated against the beam 55 to deflect it and thereby change the resistance in the strain gauges 58a and 58b. Accordingly, the circuit between these gauges and gauges 54a and 54b is unbalanced and a current proportional to the deflection of beam 55 is sent into the amplifier through the leads 186 where it is suitably boosted in power and delivered through the lead 188 to the grip motor 21. The grip motor then rotates through a proportional angle to stretch the sample sufficiently to deflect beam 50 and restore the strain gauge circuit to a balanced condition thereby shutting off the amplifier. However in the next instant of operation, drum motor 31 rotates cam 56 to increase the deflection of beam 55 and the foregoing cycle of events is repeated. The deflection of beam 55 by the cam 56 is directly proportional to the load imposed on the beam and in view of the shape of cam 56, uniform increments of load are applied to the sample to stretch it. Thus, each time the drum 25 is rotated, the same load is imposed on the sample and by means of the rider wheel 60 the resulting elongation is registered by the pen 33.

If stress in the sample is defined as the ratio of the load to the original cross-sectional area of the sample, then this mode of stretching the sample may be properly termed a stretching at constant stress.

The equipment may be suitably wired so that it may be converted from one mode of stretching to another by a simple switch.

Since the grips are relatively small and spaced close together, they may be easily enclosed in a suitable housing which will enable the testing to be conducted at various temperatures. Such a housing is indicated schematically in Fig. 2 by the broken lines 190.

Fig. 10 illustrates a typical set of test curves which are plotted by the apparatus by stretching the sample at a constant rate of percent elongation. It may be noted that the chart is in rectangular coordinance, the abscissae being parallel to the rotational axis of the drum and the ordinates being extended circumferentially of the drum.

Figs. 11 and 12 show a modification of the apparatus in which transformers may be utilized for measuring beam deflection where strain gauges may be undesirable. A small transformer 191 is mounted on the frame 10 and has a movable core member 192 connected to the beam 50 for movement through the coils 193 and 194 of the transformer. The coils are interconnected with the corresponding coils 195 and 196 of a second transformer 197 mounted adjacent beam 55 and having a movable core 198. These transformers may be connected with the amplifier 128 as shown in Fig. 12 to operate either drum motor 31 or grip motor 21 as explained in connection with the system of Fig. 5 or Fig. 9, respectively. They function to produce the same results as the strain gauges.

Variations may be made without departing from the scope of the invention as it is defined in the following claims.

I claim:

1. Tensile-testing apparatus comprising a pair of spaced grips to receive a test sample extending between the grips, means to rotate the grips in opposite directions through equal increments to stretch the sample by wrapping portions of it about the grips, a resilient member connected to one of the grips and adapted to be deflected proportionally to the load on the sample as the sample is stretched by the grips, a recording mechanism having a first element operable in response to load on the sample and having a second element operable in response to elongation of the sample, and a rider wheel mounted for frictional rolling contact with a portion of the sample wrapped on one of the grips for sensing actual elongation of the sample, said rider wheel being interconnected with said second element of the recording mechanism for synchronous movement therewith.

2. Apparatus for elongating a test sample and for indicating the load-elongation characteristics of said sample comprising means for supporting said sample at spaced-apart positions along its length and for applying a stretching force to the portion of said sample between said spaced positions, said means including a rotatable grip at one of said positions for clamping a portion of said sample and wrapping the sample around said grip to stretch said portion of the sample; means for indicating the load imposed on said test sample comprising a resilient beam connected to said grip, a rotatable drum and means operable in response to deflection of said beam under stretching force for rotating said drum; and elongation-indicating means comprising a rider wheel in frictional rolling contact with said portion of the sample and rotatable in response to movement of the sample as it is stretched past the wheel, a marker for recording on said drum the elongation of the sample, and means for moving said marker axially along said drum responsive to and synchronously with the rotation of said rider wheel.

3. Tensile-testing equipment comprising a pair of spaced grips to receive a test sample; means for rotating the grips in opposite directions by equal increments to stretch the sample by winding portions of the sample about the grips; a resilient member engaged with one of the grips and adapted to be deflected by the stretching load on the sample; means for sensing the load by the proportional deflection of said member; and means for progressively sensing the elongation of the sample comprising a rider wheel mounted for rotation by frictional contact with a portion of the sample adjacent one of the grips, a rotatable cam having a surface contour defining a predetermined functional relation between the elongation of the sample and the angular displacement of the grips, a flexible member adapted to be progressively wound on the cam surface by the rotation of the cam, an elongation-recording element connected to and movable by said flexible member, and means for rotating the cam synchronously with the rider wheel and the grips whereby the elongation-recording element indicates the actual elongation of the sample independently of the rotation of the grips.

4. Tensile-testing equipment comprising a pair of determinately-spaced grips to receive a test sample, means for rotating the grips in opposite directions by equal increments and at a constant angular velocity to stretch the sample by winding up portions of it on the grips, a rider wheel mounted for rotation by frictional contact with a portion of the sample on one of the grips and rotatable by the actual translational movement of the sample, a rotatable cam having a surface defining a predetermined functional relation between the elongation of the sample and the progressive angular displacement of the rider wheel, a flexible member depending from the cam surface and adapted to be wrapped on the cam by rotation thereof, an elongation-recording member secured to the flexible member and the movement of which being controlled by said flexible member, means for rotating the cam synchronously with and proportionately to the progressive angular displacement of the rider wheel whereby said elongation-recording member traces the actual elongation of the sample independently of grip rotation, and means for recording load on the sample simultaneously with said motion of elongation-recording member.

5. The equipment of claim 4 in which the means for rotating the cam synchronously with and proportionately to the progressive angular displacement of the rider wheel includes a follow-up device to precisely conform the motion of the cam to the motion of the rider wheel.

6. Tensile-testing equipment comprising a pair of determinately-spaced grips to receive a test sample, means for rotating the grips in opposite directions by equal increments to stretch the sample by winding up portions of it on the grips, a recording mechanism having a first element movable in response to elongation of the sample and a second element movable in response to load, a first resilient member connected to one of the grips, and adapted to be deflected proportionately to the load imposed on the sample, means for generating an electrical signal proportional to the deflection of said member, means for moving said second element of the recording mechanism proportionately to said electrical signal, a second deflectable resilient member supported away from said grips, means for generating an electrical signal proportional to the deflection of said second resilient member, and means for deflecting said second resilient member simultaneously with the movement of said second element of the recorder to generate an electrical signal counter to that generated by the deflection of said first resilient member to precisely control the motion of said second element of the recording mechanism.

7. The equipment of claim 6 which further includes means for varying the stiffness of said second resilient member proportionately to the thickness of the test sample.

8. Tensile-testing equipment comprising a pair of determinately-spaced grips to receive a test sample, means for rotating the grips in opposite directions by equal increments to stretch the sample by winding up portions of it on the grips, a recording mechanism having a first element movable in response to elongation of the sample and a second element movable in response to load, a flexible member connected to said first element, a cam to which said flexible member extends, the member being adapted to be wound onto the surface of said cam to move said first element, the surface of the cam defining a predetermined relation between the elongation of the sample and the rotational speed of the grips, a shaft for supporting said cam, means for moving said flexible member at a uniform linear speed to rotate said cam shaft in accordance with the function defined by the cam surface, means for rotating said grips proportionally to the successive instantaneous angular displacements of said shaft to wind the sample on the grips, a rider wheel mounted for rotation by frictional contact with a portion of the sample adjacent one grip, the rotation of the rider wheel being precisely proportional to the actual elongation of the sample, and means actuated by the rider wheel to vary the rotation of the grips so that the actual elongation of the sample conforms to said predetermined relation defined by the cam surface.

9. In the tensile-testing apparatus of claim 8, a first follow-up device actuated by the movement of said flexible member to precisely regulate the rotation of said cam shaft, and a second follow-up device actuated by the rotation of said rider to precisely regulate the rotation of the grips in accordance with the rotation of said cam shaft.

10. In an apparatus for determining the load-elongation relationship of a sample of extensible material, means for supporting a test sample at two spaced-apart positions along its length and operable for continuously stretching a progressively shorter length of the sample, means for continuously sensing the elongation of said sample at a location adjacent one of said positions, said sensing means being responsive to the actual length of the sample progressively moving past said location during said stretching, means for continuously comparing said sensed value of elongation with a value of elongation theoretically required to maintain said stretching at a predetermined rate of elongation, and means for continuously varrying the stretching rate by an amount equivalent to the difference between said sensed value and said theoretical value.

11. Apparatus for elongating a test sample and for determining the load-elongation relationship in said test sample comprising a supporting structure, a pair of spaced grips mounted rotatably on said structure, at least one of said grips comprising a pair of hinged jaws having mating faces cooperating to engage a portion of the sample between the jaws, resilient means normally urging said jaws together at said faces and each jaw having a generally semi-cylindrical outer sample-engaging surface, one of said jaws having a cross-sectional radius smaller by about half the thickness of said sample than the corresponding radius of the other jaw and the center of said jaw of smaller radius being offset from the center of said other jaw by an amount about equal to the difference in radii of the jaws, means for rotating said grips in opposite directions by equal increments to wrap said sample around said grips to stretch the sample, means for sensing the elongation of said sample comprising a rider wheel mounted for frictional rolling contact with said sample adjacent said grip having hinged jaws, means operable in response to the rolling movement of said rider wheel for indicating the elongation of the sample, means for sensing and indicating the stretching load applied to the sample, and means for continuously comparing the load and elongation of the sample.

12. In a tensile-testing apparatus, means for supporting a test sample at two spaced-apart positions along its length, said means including at least one of said positions a grip rotatably mounted to wind the sample thereon and thereby elongate the sample, a rider wheel mounted for rotation by frictional contact with the sample adjacent said grip for sensing actual elongation of the sample as the sample is wound on said grip, means for rotating said grip in accordance with a predetermined functional relation between the theoretical elongation of the sample as it is wound on the grip and the rotational displacement of the grip to effect such elongation, and means actuated by the rotation of the rider wheel for continuously varying the rotation of the grip by an amount equivalent to the difference between the actual elongation of the sample and said predetermined theoretical elongation.

13. Tensile-testing equipment comprising means for supporting a test sample at only two spaced-apart positions along its length and operable for continuously stretching a progressively shorter length of the sample intermediate said spaced-apart positions, said means at one of said positions being mounted for lateral deflection proportional to the stretching load on the sample; means for sensing the deflection of said means at said position as a function of load on the sample; means for progressively sensing the elongation of the sample adjacent one of said positions; and means operable synchronously with the operation of one of said sensing means and in response to the other of said sensing means for indicating the load-elongation relationship.

14. Apparatus in accordance with claim 13 in which the means for supporting the sample at at least one of said positions is a grip rotatable to wind the sample thereon to effect said elongation.

15. Apparatus in accordance with claim 13 in which said means for sensing elongation is a rider wheel mounted adjacent one of said positions for rotation by frictional contact with the sample.

16. Tensile-testing equipment for extensible rubber-like materials, the equipment comprising means for supporting a test sample at two spaced-apart positions along its length, said means at at least one of said positions being a grip engageable with the sample and rotatable to wrap the sample upon the grip to stretch the portion of the sample extending between said positions; a resilient member engaged with said grip and adapted to be deflected by the stretching load on the sample; means for sensing the load by the proportional deflection of said member; and means for progressively sensing the elongation in the sample comprising a rider wheel mounted for rotation by frictional contact with the sample adjacent said grip, a cam having a surface contour defining a predetermined functional relation between elongation of the sample and the angular displacement of said grip, an elongation-indicating element engaged with and operated in response to movement of said cam, and means for rotating the cam synchronously with said rider wheel and said grip whereby said elongation-indicating element indicates the actual elongation of the sample independently of the rotation of the grips.

17. The equipment of claim 16 in combination with means movable in response to said load-sensing means and cooperating with said elongation-indicating element to provide a continuous visible record of the load-elongation relationship of said sample.

18. Tensile testing equipment comprising means for supporting a test sample at two spaced-apart positions along its length and operable for continuously stretching a progressively shorter length of the sample, said means at at least one of said positions including a grip rotatable to wind the sample thereon and having a member attached thereto deflectable in proportion to the stretching load on the sample; means for sensing the load by the proportional deflection of said member; means for progressively sensing the elongation of the sample; a cam having a surface contour defining a predetermined functional relation between the elongation of the sample and the angular displacement of the grip, means engaged with said cam surface for indicating elongation of the sample, and means for rotating said cam synchronously with said grip whereby said elongation-indicating means indicates the actual elongation independently of the rotation of the grips.

19. Tensile-testing apparatus for measuring and recording the load-elongation characteristics of rubber-like material, the apparatus comprising a pair of laterally spaced grips interconnected for rotation through equal increments in opposite directions, the grips being adapted to support a sample extending between and engaged with each grip, means for rotating the grips in unison to wind the sample on the grips and impart a stretching force to the sample, a rider wheel mounted for frictional rolling engagement with a portion of the sample adjacent one grip as the grips are rotated whereby the rotation of the rider wheel is a function of the actual elongation of the sample independently of the rotation of the grips, means for supporting one of the grips for resilient lateral displacement in response to the force exerted on the grips by the stretched sample, means for sensing the proportional deflection of the latter said grip as a function of the stretching load on the sample, and a recorder for indicating the load-elongation characteristic of the sample, said recorder including a first element movable in accordance with the rotation of the rider wheel to indicate elongation and a second element movable in response to said grip deflection sensing means to indicate load.

20. Tensile testing equipment comprising means at two laterally spaced locations for engaging a test sample of elastic rubberlike material, said means at at least one of said positions being a grip mounted for rotation to stretch the sample by winding it on the grip, and said means at at least one of said positions being mounted for resilient deflection proportional to the stretching load imposed on said sample by said winding, means for sensing deflection of the latter said means as a function of said stretching load, means for rotating said grip to stretch the sample, means for continuously sensing the actual elongation of said sample as the sample wound on said grip, and means for visually indicating the load-elongation relationship, said latter means including a first member operable in response to said grip-rotating means and synchronously with the operation of one of said sensing means and a second member operable in response to the other of said sensing means.

References Cited in the file of this patent

UNITED STATES PATENTS

| | | |
|---|---|---|
| 2,121,149 | James | June 21, 1938 |
| 2,217,080 | Ruch | Oct. 8, 1940 |
| 2,421,222 | Schaevitz | May 27, 1947 |
| 2,445,683 | Macgeorge | July 20, 1948 |

FOREIGN PATENTS

| | | |
|---|---|---|
| 233,445 | Germany | Apr. 8, 1911 |
| 610,232 | Great Britain | Oct. 13, 1948 |